United States Patent
Morrison et al.

(10) Patent No.: US 10,996,780 B2
(45) Date of Patent: May 4, 2021

(54) DISPLAY ARRANGEMENT

(71) Applicant: Zytronic Displays Limited, Blaydon on Tyne (GB)

(72) Inventors: Andrew Morrison, Blaydon on Tyne (GB); Christopher Graham John Caldwell, Blaydon on Tyne (GB); Stephen Michael Ormston, Blaydon on Tyne (GB); Philip Andrew Rudland, Blaydon on Tyne (GB)

(73) Assignee: ZYTRONIC DISPLAYS LIMITED, Blaydon on Tyne (GB)

( * ) Notice: Subject to any disclaimer, the term of this patent is extended or adjusted under 35 U.S.C. 154(b) by 0 days.

(21) Appl. No.: 16/611,342

(22) PCT Filed: May 9, 2018

(86) PCT No.: PCT/GB2018/051246
§ 371 (c)(1),
(2) Date: Nov. 6, 2019

(87) PCT Pub. No.: WO2018/206947
PCT Pub. Date: Nov. 15, 2018

(65) Prior Publication Data
US 2020/0167028 A1     May 28, 2020

(30) Foreign Application Priority Data

May 10, 2017 (GB) ...................................... 1707478
Sep. 29, 2017 (GB) ...................................... 1715778

(51) Int. Cl.
*G06F 3/041*     (2006.01)
*G06F 3/0488*     (2013.01)

(52) U.S. Cl.
CPC .......... *G06F 3/0412* (2013.01); *G06F 3/0416* (2013.01); *G06F 3/0488* (2013.01); *G06F 2203/04104* (2013.01); *G06F 2203/04112* (2013.01)

(58) Field of Classification Search
CPC ................. G06F 3/0416; G06F 3/0412; G06F 2203/04112; G06F 2203/04104; G06F 3/041; G06F 3/0488
See application file for complete search history.

(56) References Cited

U.S. PATENT DOCUMENTS

| | | |
|---|---|---|
| 2006/0197753 A1 | 9/2006 | Hotelling |
| 2010/0127992 A1 | 5/2010 | Schmid |
| 2013/0300678 A1 | 11/2013 | Kang et al. |

(Continued)

FOREIGN PATENT DOCUMENTS

| | | |
|---|---|---|
| EP | 2 187 290 A1 | 5/2010 |
| EP | 2 426 582 A2 | 3/2012 |
| GB | 2 502 601 | 12/2013 |

OTHER PUBLICATIONS

International Search Report and Written Opinion; PCT/GB2018/051246; dated Nov. 30, 2018; 23 pages.

*Primary Examiner* — Muhammad N Edun
(74) *Attorney, Agent, or Firm* — Knobbe Martens Olson & Bear LLP

(57) ABSTRACT

A multi-touch touch panel and a method of detecting touches is disclosed. The touch panel comprises at least one hole in an active region of the touch panel, having a selected size for mechanically mounting a respective user input device.

12 Claims, 14 Drawing Sheets

(56) References Cited

U.S. PATENT DOCUMENTS

| | | |
|---|---|---|
| 2014/0168132 A1 | 6/2014 | Graig et al. |
| 2015/0261297 A1 | 9/2015 | Quek |
| 2016/0011633 A1* | 1/2016 | Watanabe ............. G06F 1/1637 345/184 |
| 2016/0188047 A1 | 6/2016 | Chang |
| 2016/0202515 A1* | 7/2016 | Watanabe ............... G06F 1/169 349/153 |
| 2016/0259544 A1* | 9/2016 | Polikarpov ........... G06F 3/0412 |

* cited by examiner

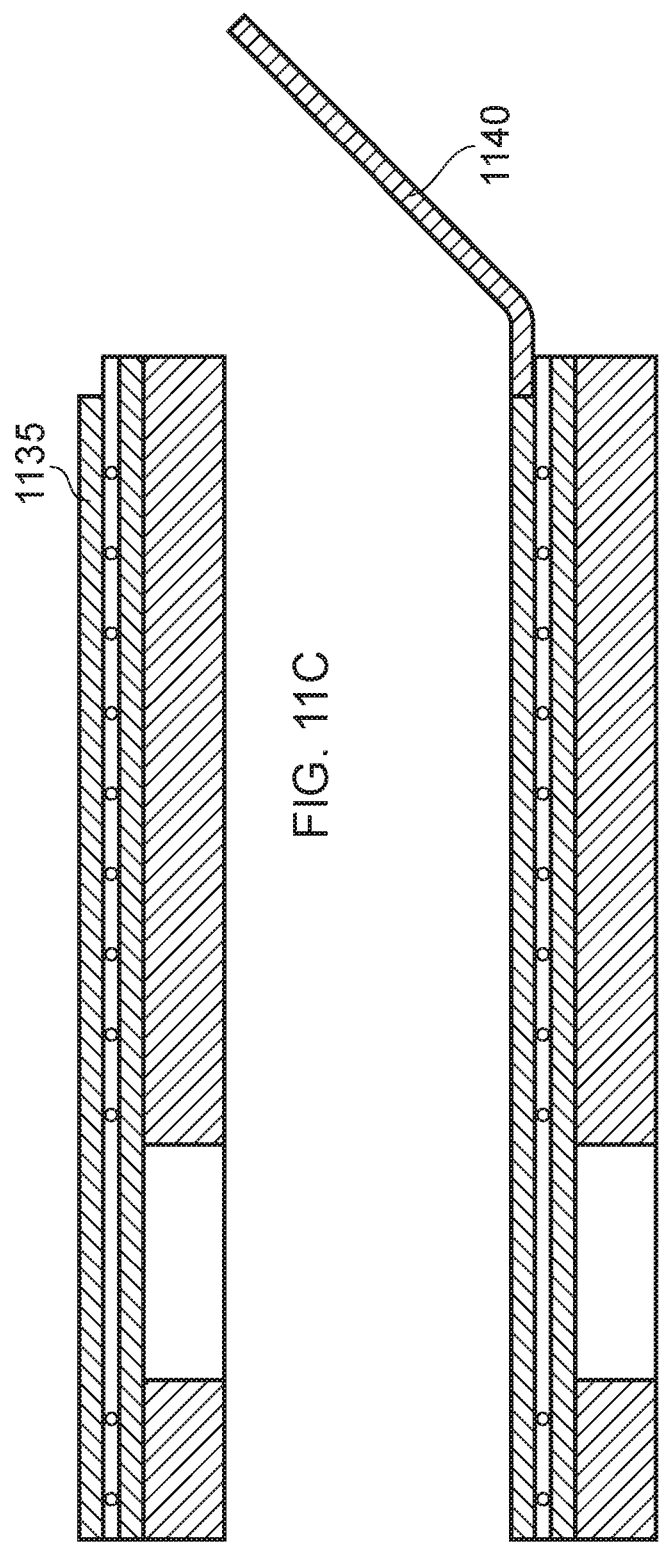

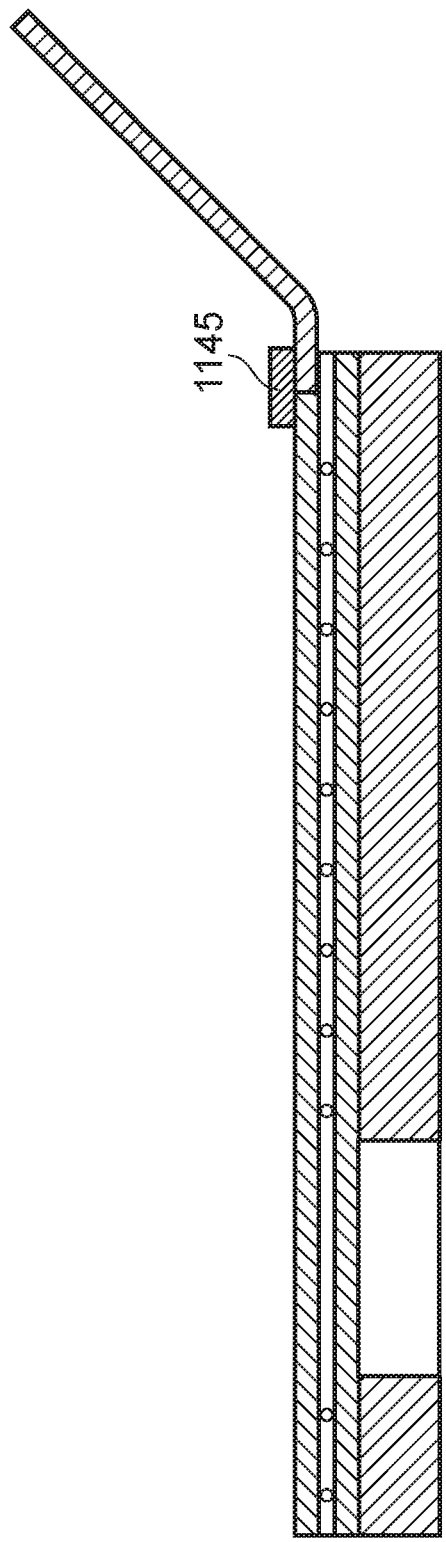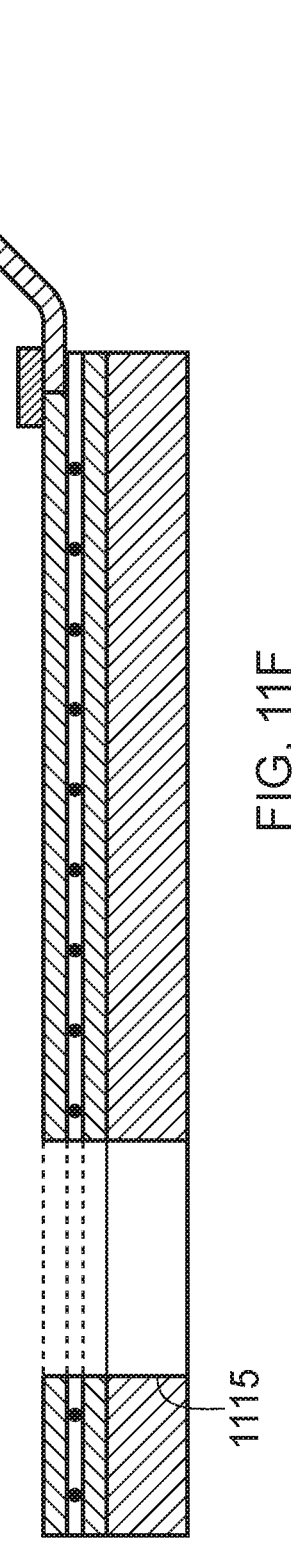

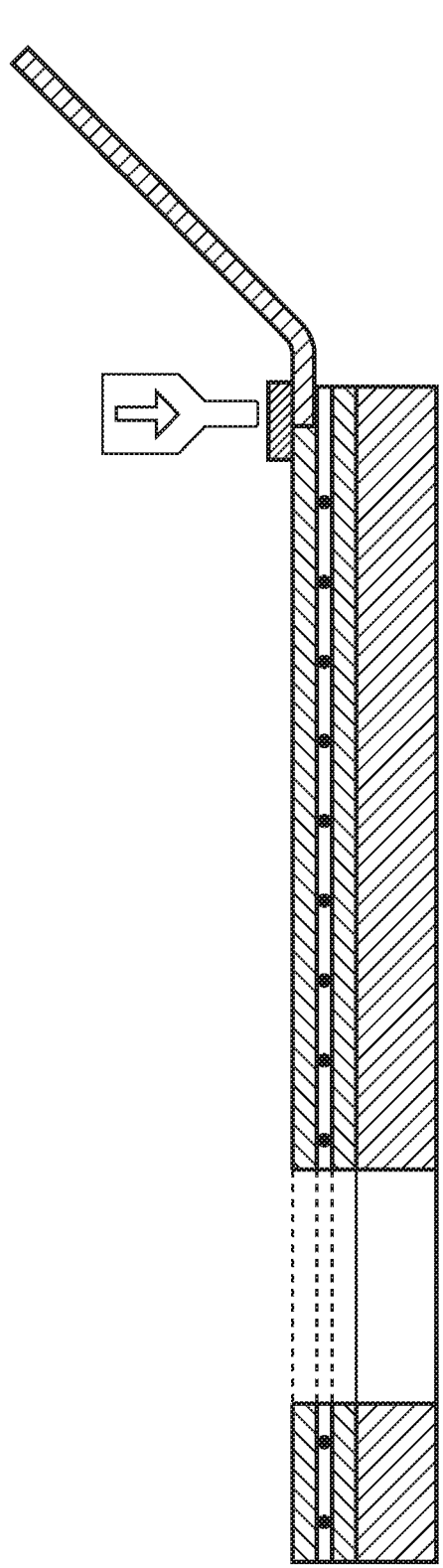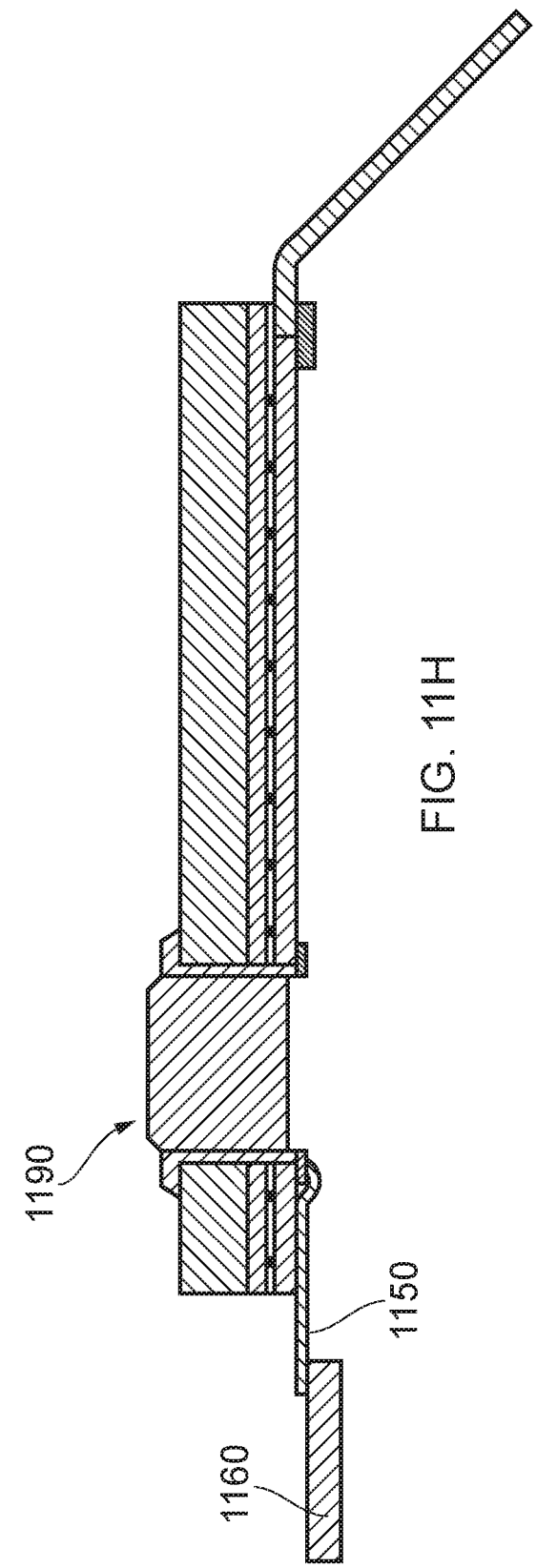

DISPLAY ARRANGEMENT

The present invention relates to a display arrangement. In particular, but not exclusively, the present invention relates to a combined display and touch panel together providing a touch screen that includes at least one user input device incorporated wholly or in part within a region that is both a visual area of the display and a touch sensitive region of the touch panel.

Many input devices are known which human operators can interact with to thereby provide an input indicating a selection. For example conventional input devices include mechanical input devices like mechanical buttons or keys or track balls or sliders. Other types of input devices like touch screens or NFC readers are also known. Touch screens in particular are increasingly popular and these allow a user to make selections and indicate choice by touching a surface of a touch panel in one or multiple locations with those locations being associated with regions displayed on an underlying display screen. By correlating detected touch positions in the plane of the touch panel with corresponding display positions in the plane of the underlying display a user can select one or more choices. Such selection can be used to indicate an instruction or for many other purposes.

Conventionally touch screens include a touch panel, a controller and a software driver. A touch panel is a clear panel with a touch sensitive surface. The touch panel is positioned in front of a display so that the touch sensitive surface covers the viewable area of the display screen. The touch panel and associated screen together can be referred to as a touch screen or display arrangement.

There are many different types of touchscreen technology available including resistive, capacitive, infrared and surface acoustic wave techniques.

A concern expressed by certain users is that touch screens and selections that are made by utilising touch screens can be prone to accidently indicating an undesired choice. That is to say some people have expressed a concern that it is relatively easy to accidentally make an undesired choice by using a touch screen. Whilst in many situations touch screens operate without such errors there is a desire to be able to allay people's fears on this point. Furthermore there is a desire to be able to incorporate touch screen technology with other mechanical-type input devices which can be utilised to make certain key decisions or can be used in combination with touch screen technology when the use of a particular type of mechanical input device is well known in a particular field and therefore human users are well versed in such usage.

An example of one situation where it would be desirable to be able to incorporate a touch screen display arrangement with mechanical-type buttons is in the gaming industry. Certain gambling machines are well known. These gambling machines operate according to gaming rules and permit human operators to invest their money via a user interface which typically includes artwork and/or display screens and some form of user interface by which the user can indicate bets being placed and choices being made. Conventionally such machines have been mechanical button type machines but more recently a trend towards the use of touch screens has been observed in the gaming industry. However when certain "large" bets are to be placed there has been a reluctance amongst certain users to use purely touch screen based gambling devices.

In certain conventional solutions to this problem either a small touch screen has been used surrounded by conventional mechanical type buttons or a large underlying LCD screen has been overlaid with a small touch screen. In this latter solution large areas of the underlying LCD screen have been masked off with an opening in the masking being aligned with the touch screen. Mechanical type buttons have been located offset from the active region of the touch screen and overlying peripheral portions of the underlying display. These solutions have been unacceptable for a number of reasons. Firstly in the case of a small display and touch screen with conventional adjacent mechanical buttons the user interface experience is limited and large regions of a playing surface provided to a user remain unused. In the latter case in which buttons are outside a visual area a relatively large display is used which is costly and the user experience is diluted by large areas of unused "real estate".

It is an aim of the present invention to at least partly mitigate the above-mentioned problems.

It is an aim of certain embodiments of the present invention to provide a hybrid display arrangement that incorporates a capacitive touch panel with an underlying display and with one or more user input devices, such as a button or slider or the like, protruding wholly or at least partially through the touch panel.

It is an aim of certain embodiments to provide a touch panel having a transparent capacitive sensing medium, configured to detect multiple touches simultaneously and to produce distinct signals representative of the location of the touches, whilst also enabling one or more mechanical input devices such as buttons or sliders or the like to be utilised by a user to provide inputs and which are at least partially or wholly located within an active region of the touch panel. It will therefore be appreciated that each mechanical input device will be mechanically mounted in a corresponding hole or recess which may be at least partially or wholly within the active area of the touch screen.

It is an aim of certain embodiments of the present invention to provide a display arrangement which includes a display having a screen for displaying a graphical user interface.

It is an aim of certain embodiments of the present invention to provide a computer implemented method which is capable of simultaneously receiving one or more actual touches from a surface of a transparent touch panel and presses from a mechanical input device such as a button or slider or the like located within the active region of the touch panel.

It is an aim of certain embodiments of the present invention to provide a computer system including a processor configured to execute instructions and carry out operations associated with a computer system and which can receive signals from a touch panel and one or more mechanical input devices located within the active area of the touch screen.

According to a first aspect of the present invention there is provided a multi-touch touch panel, comprising at least one hole in an active region of the touch panel, having a selected size for mechanically mounting a respective user input device.

Aptly the user input device comprises a button or a slider or a moving/rotating dial or a lever or an NFC reader.

Aptly each hole is a through hole or recessed region.

Aptly each hole is a hole in a glass or plastic substrate.

Aptly the hole or holes through the substrate, which forms part of the touch panel, is non-touch active within the touch sensor functionality.

Aptly the or each non-touch active area in a touch panel is achieved by routing electrically isolated conductors to thereby provide a pathway for the electrically isolated conductors around each hole.

Aptly signal processing algorithms within a touch controller allow non-touch areas to be defined within the functionality of sensor operation.

Aptly touch functionality is desensitized in the sensor within a predetermined area associated with each user input device which requires a hole in the substrate.

Aptly multi-touch activation is provided immediately around the non-active hole/s in the multi-touch touch panel.

According to a second aspect of the present invention there is provided a multi-touch sensing panel arrangement wherein the conducting wire of electrically isolated conductors used to provide electrodes of a touch sensitive touch panel is of a diameter of about around 4 to 40 microns.

Aptly the diameter of the electrically isolated conductors is 5 to 18 microns.

According to a third aspect of the present there is provided a multi-touch sensing panel for a display screen.

Aptly the touch panel comprises a panel including a plurality of electrically isolated conductors crossing each other at a plurality of intersection points and a touch detector, said touch detector being arranged to detect a user touch by detecting a reduction or increase in energy transferred by capacitive coupling between the conductors that cross at the intersection points.

Aptly a reduction or increase in capacitive coupling energy detected at a given intersection point corresponds to a user touch detected at that intersection point.

Aptly each of the plurality of electrically isolated conductors comprises a conducting wire individually insulated with an insulating coating.

According to a fourth aspect of the present invention there is provided a method for detecting touches at a sensing plane of a touch panel that includes at least one excluded zone, comprising the steps of determining a location of a possible touch on a touch panel, determining if said a location is associated with an excluded zone in an active region of the touch panel, and indicating a detected touch if said a location is not associated with the excluded zone.

Aptly the step of determining if said a location is associated with the excluded zone comprises determining if a cell associated with said a location is a cell having a cell index included in a list of excluded cell indexes.

Aptly the method further comprises preventing a detected touch being indicated if said a cell index is included in said a list of excluded cell indexes.

Aptly the excluded zone has a square or rectangular shape.

Aptly the step of determining if said a location is associated with the excluded zone comprises determining if an interpolated touch position for said a location is within a predetermined prohibited area corresponding to the excluded zone.

Aptly the method comprises preventing a detected touch being indicated if the interpolated touch position is within the prohibited predetermined area.

Aptly the predetermined prohibited area is a region of a virtual field correlated to the active region of the touch panel.

Aptly the excluded zone has a square or rectangular or circular or triangular or irregular shape.

Aptly the excluded zone has a shape corresponding to a shape of a user input device.

Aptly the user input device is a mechanical input device such as a mechanical button or slider or is a contactless input device such as an NFC reader.

Aptly each excluded zone has a shape that corresponds with a shape of a hole comprising a respective through hole or recess in a substrate of the touch panel.

Aptly the method further comprises, via a host computer, receiving touch signals that indicate a detected touch in the active area of the touch panel and receiving input signals from at least one user input device located in the active area.

Aptly the method further comprises placing a stake according to a predetermined set of gaming rules responsive to a user input at the user input device.

According to a fifth aspect of the present invention there is provided a computer program or computer code executable by a computer or microprocessor of a touch controller arranged to perform the method of detecting touches at a sensing plane of a touch panel that includes at least one excluded zone via the steps of determining a location of a possible touch on a touch panel, determining if said a location is associated with an excluded active region of the touch panel, and indicating a detected touch if said a location is not associated with the excluded zone.

According to a sixth aspect of the present invention there is provided a touch panel, comprising a transparent substrate comprising at least one hole, an electrode grid, proximate to a surface of the substrate, including a plurality of sensor electrodes and a plurality of drive electrodes arranged in a pattern, wherein the sensor electrodes and drive electrodes are arranged in a pattern that routes a plurality of the electrodes around at least a portion of an edge region of any hole.

Aptly each sensor electrode that is not routed around a hole follows a repetitive labyrinthine pathway, and each drive electrode that is not routed around a hole follows a repetitive labyrinthine pathway.

Aptly each sensor electrode and drive electrode crosses at a respective crossing point and each crossing point defines a centre of a respective cell, having a respective cell index, of the touch panel.

Aptly the cells tessellate in regions distal to a hole in the grid.

Aptly no portion of any electrode is located within a predetermined margin at an edge region of each hole.

Aptly electrodes are routed around the hole along a pathway including a circumventing pathway portion that is spaced apart from and parallel to an adjacent portion of the edge region.

Aptly each rerouted electrode follows a usual pathway, corresponding to a pathway followed commonly in cells distal to a hole, until the usual path of an electrode pathway extends to within a predetermined distance of an edge region of a hole at which point the electrode pathway is immediately turned perpendicular to a local edge region.

Aptly after turning perpendicular to the local edge region, the electrode pathway extends in a straight pathway portion and is then further turned in a direction perpendicular to the straight pathway portion into a circumventing pathway portion in which the electrode pathway is spaced apart from and runs parallel to an adjacent portion of the edge region.

Aptly the edge region of each hole or the edge region plus predetermined margin of each hole corresponds with an excluded zone in an active region of the touch panel.

According to a seventh aspect of the present invention there is provided a touch screen system, comprising a touch panel comprising a substrate and an electrode grid proximate to a first surface of the substrate, a display proximate to the touch panel, and a touch detector that receives signals from sensor electrodes of the electrode grid and indicates a detected touch only if a location of a possible touch is not associated with an excluded zone in an active region of the touch panel.

Aptly the substrate of the touch panel comprises at least one hole and a plurality of electrodes of the electrode grid are routed around an edge of the hole.

Aptly the touch detector comprises a list of excluded cell indexes.

Aptly the touch detector stores values associated with a virtual field correlated to the active region of the touch panel and includes a prohibited area as a region of the virtual field for each excluded zone.

Aptly the touch detector determines if an interpolated touch position is within the prohibited area.

Aptly each hole in the substrate of the touch panel comprises a through hole or a recess.

According to an eighth aspect of the present invention there is provided a computer system, comprising a processor configured to execute instructions and to carry out operations associated with a computer system, a display device that is operatively coupled to the processor and a touch screen associated with an active area and with one or more user input devices at least partially within the active area of the touch screen.

Aptly each user input device comprises a mechanical input device such as a button or slider or the like wholly or in part within the active area of the touch screen.

Aptly possible touches provided by the touch screen which fall within an excluded area associated with a user device in the active area of the touch screen are ignored.

Aptly possible touches associated with a cell having a cell index in an excluded list of cell indexes are ignored.

Aptly an interpolated touch falling within a prohibited area which is a region of a virtual field correlated to the active region of the touch panel is ignored.

According to a ninth aspect of the present invention there is provided a multi-touch sensing panel wherein a front protective layer is a glass or plastic substrate that includes one or more holes of variable size for mechanically mounting user input devices such as buttons, sliders, moving/rotating dials, NFC readers or the like.

Certain embodiments of the present invention provide a hybrid display arrangement that incorporates a capacitive touch panel having an active area and one or more user input devices such as a button or buttons within the active area or at least partially within the active area of the touch panel.

Certain embodiments of the present invention provide a touch panel for a touch screen which includes a transparent capacitive sensing medium able to detect multiple touches simultaneously together with at least one mechanical input device such as a button within an active area of the touch panel which can likewise be utilised to provide user input signals.

Certain embodiments of the present invention provide a computer implemented method for simultaneously receiving one or more actual touches on a touch screen and simultaneous, or close in time, presses or sliding actions on a mechanical input device located within an active region of a touch screen.

Certain embodiments of the present invention provide a gambling machine in which a user can use a touch screen and/or button/s within an active region of the touch screen to place bets.

Certain embodiments of the present invention provide a computer system of an information kiosk, automated teller machine (ATM), point of sale machine (POS), industrial machine, gaming machine, arcade machine, vending machine, airline e-ticket terminal, restaurant reservation terminal, customer service station or the like.

Certain embodiments of the present invention will now be described hereinafter, by way of example only, with reference to the accompanying drawings in which.

Figure 5:
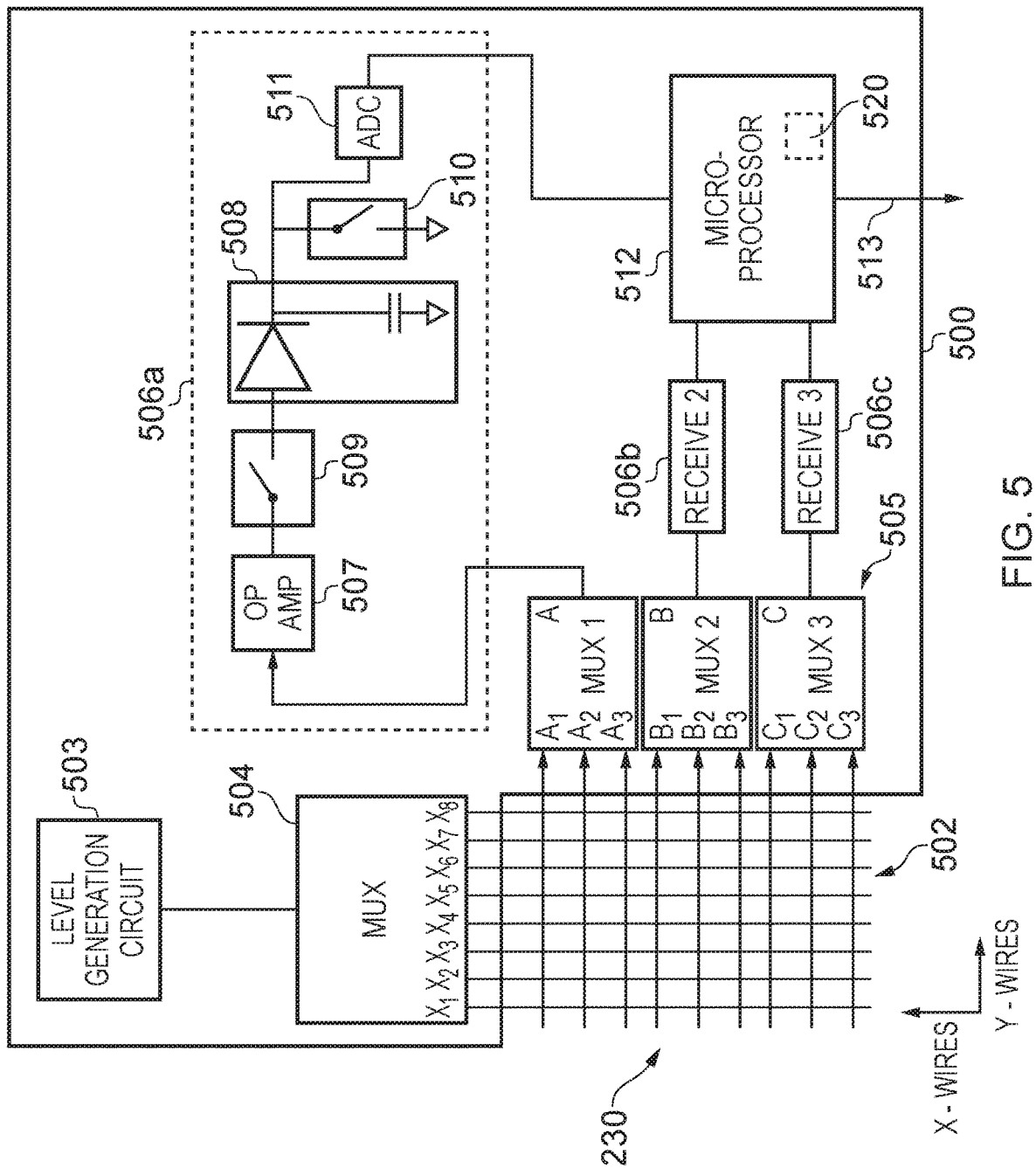
Figure 6:
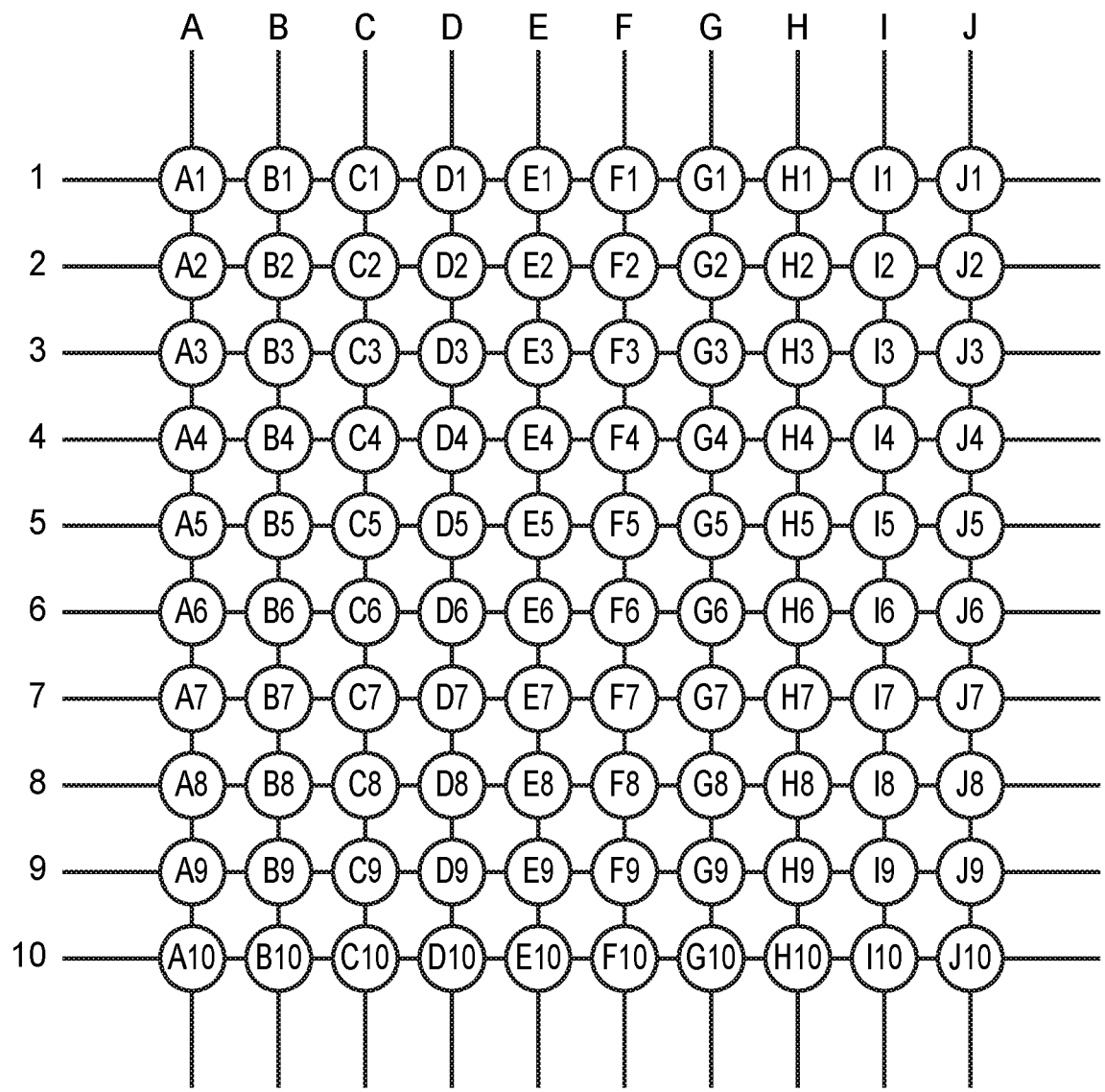
Figure 7:
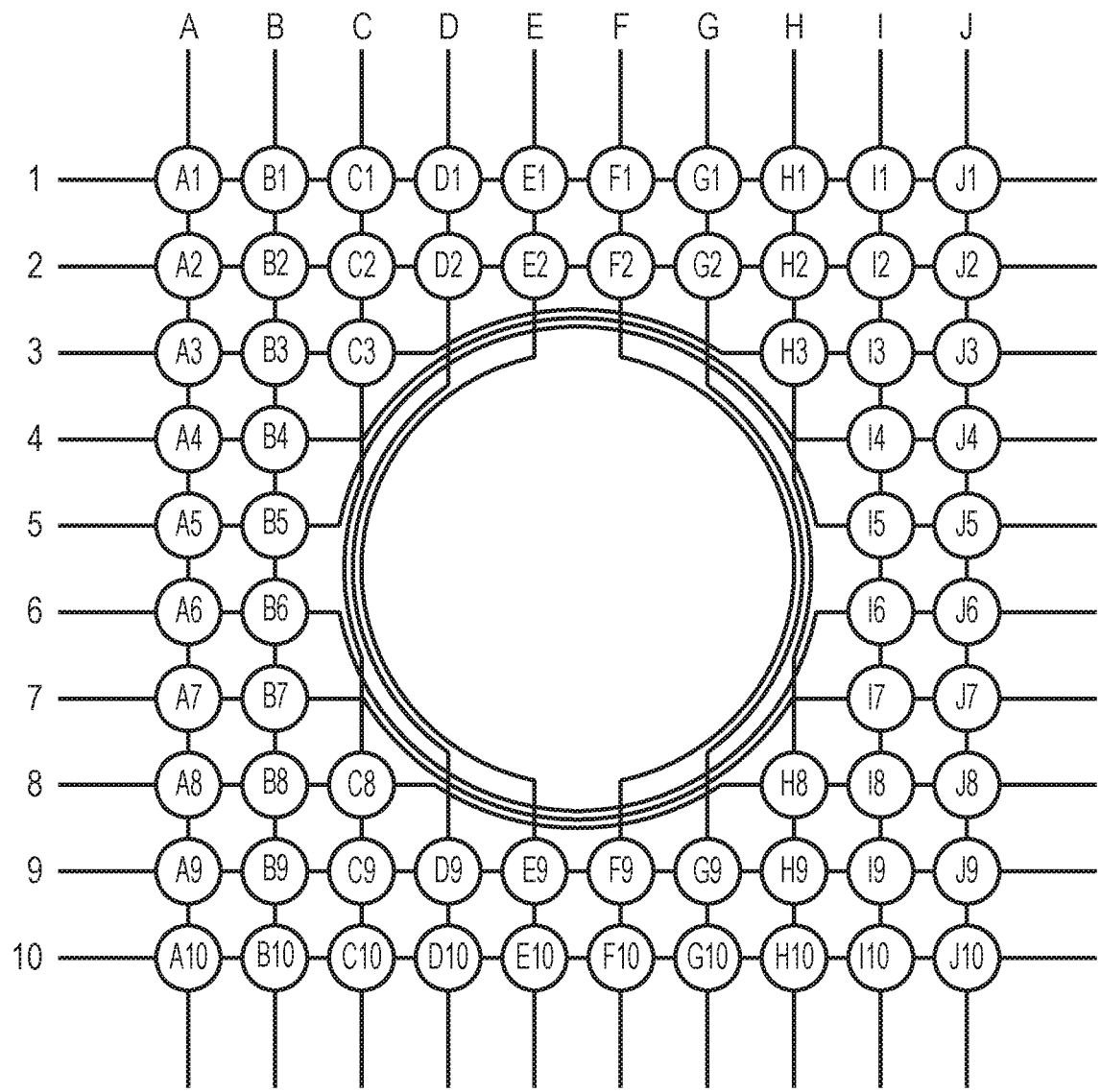
Figure 8:
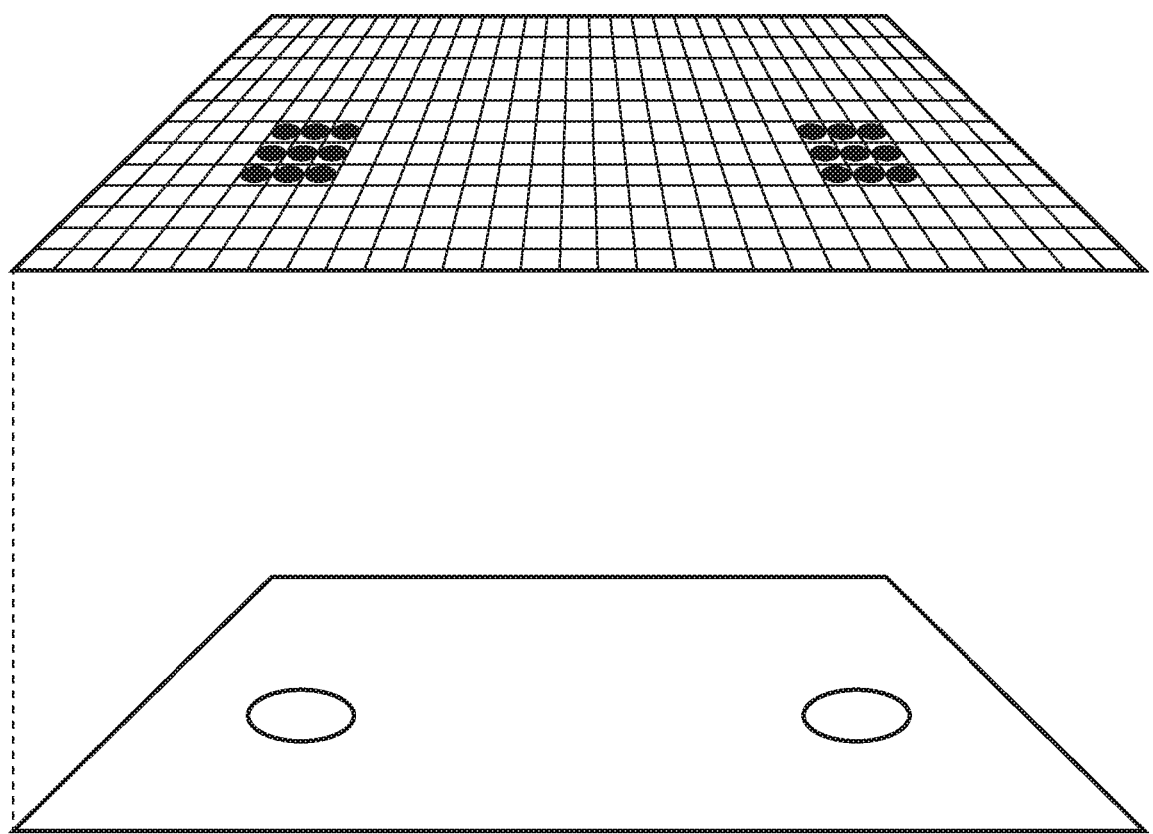
Figure 9:
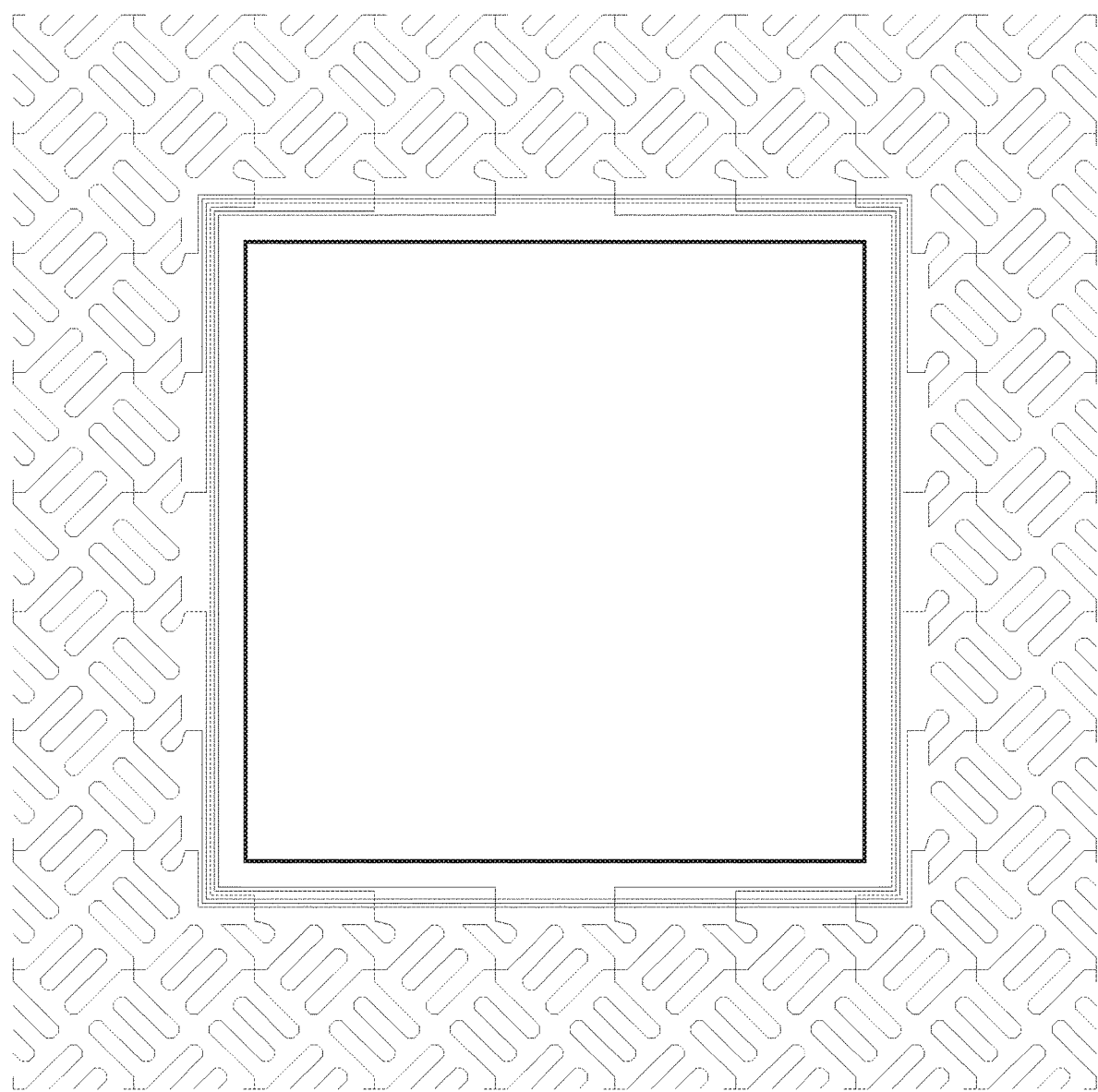
Figure 10:
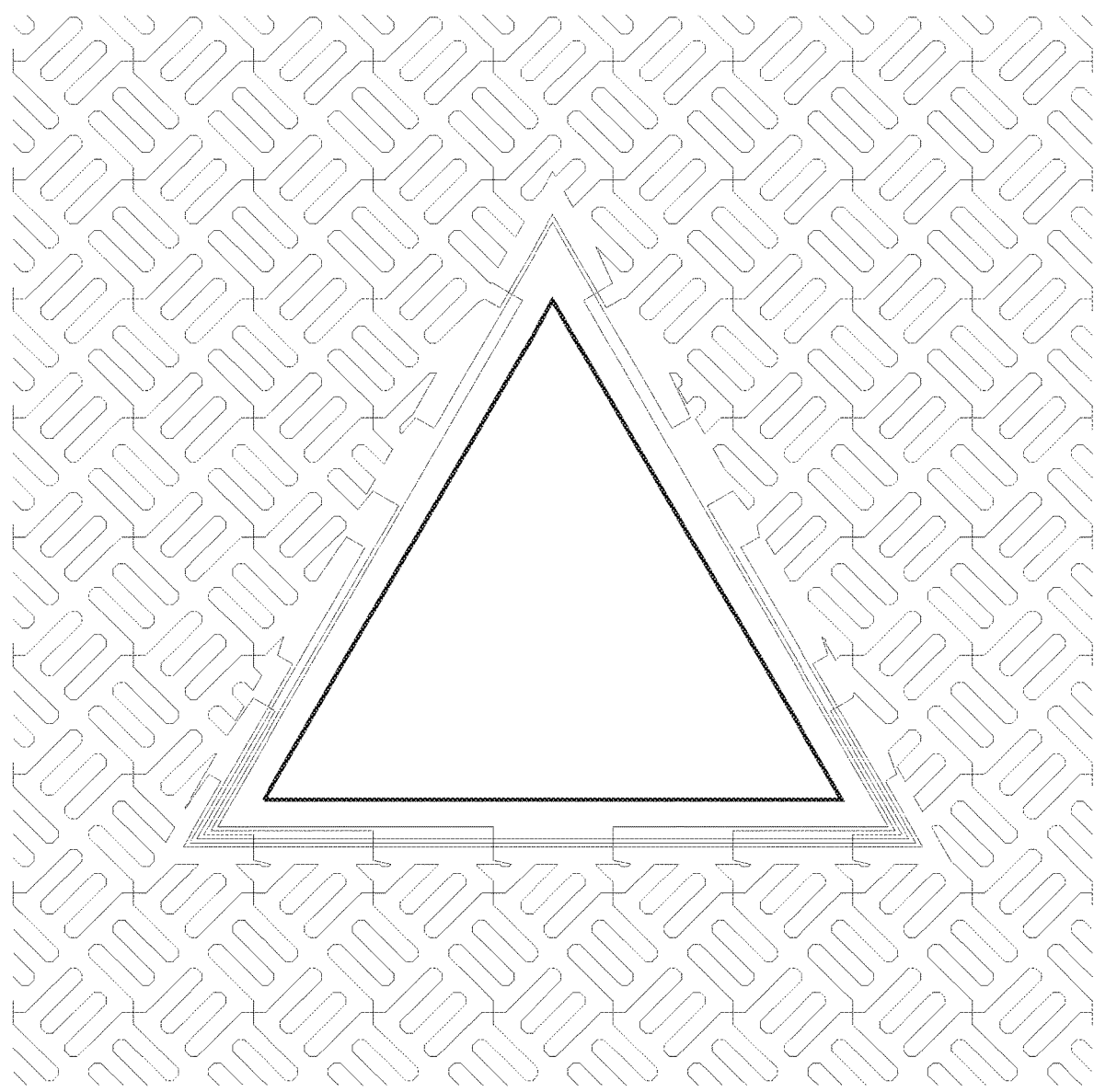
Figure 11A:
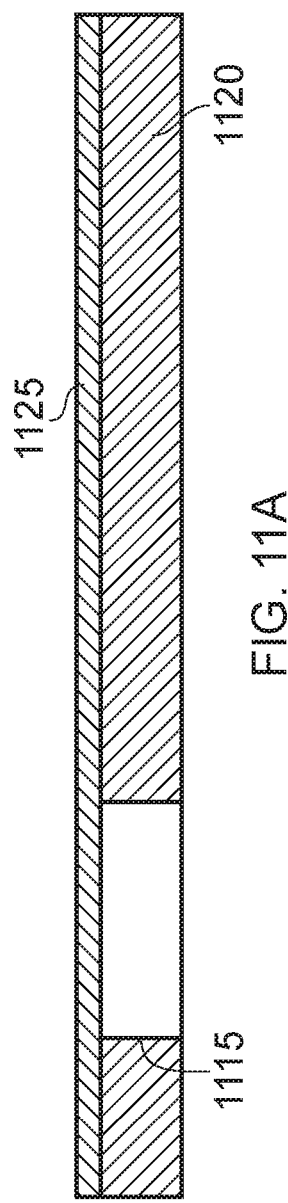

FIG. 5 schematically illustrates electrodes and a touch controller and connection to a host computer in more detail;

FIG. 6 illustrates a grid of intersection points;

FIG. 7 illustrates non excluded cells around a round hole;

FIG. 8 illustrates prohibited areas in a virtual field that is correlated to the active area;

FIG. 9 illustrates sensor and drive electrodes around a square aperture;

FIG. 10 illustrates sense and drive electrodes around a triangular aperture; and FIG. 11 illustrates manufacturing steps for producing a touch panel including at least one mechanical input device.

In the drawings like reference numerals refer to like parts.

Throughout this description reference will be made to a display. A display is configured to display a graphical user interface (GUI) which provides user information to a user. The display device may optionally be a monochrome display, colour display and may optionally be a liquid crystal display (LCD), organic light emitting diode (OLED) display, quantum dot display or the like.

Reference is also made herein after to a transparent touch panel. In this sense transparent means that a human user effectively sees wholly through the panel. This can be achieved by utilising very thin electrodes such as very fine small diameter wires or substantially transparent material such as ITO or the like to generate electrodes which are provided on a side of a clear substrate of the panel. The net effect is that a human user can see displayed information through the sensing and drive electrodes.

A touch panel of a touch screen recognises an actual touch or touches as a touch event or multiple touch events on a surface of the touch panel and thereafter outputs signals representative of this information to a host device. The host device can be a computer such as a desktop, hand held or tablet computer or laptop. The host device performs an action based on the touch event.

Figure 1:
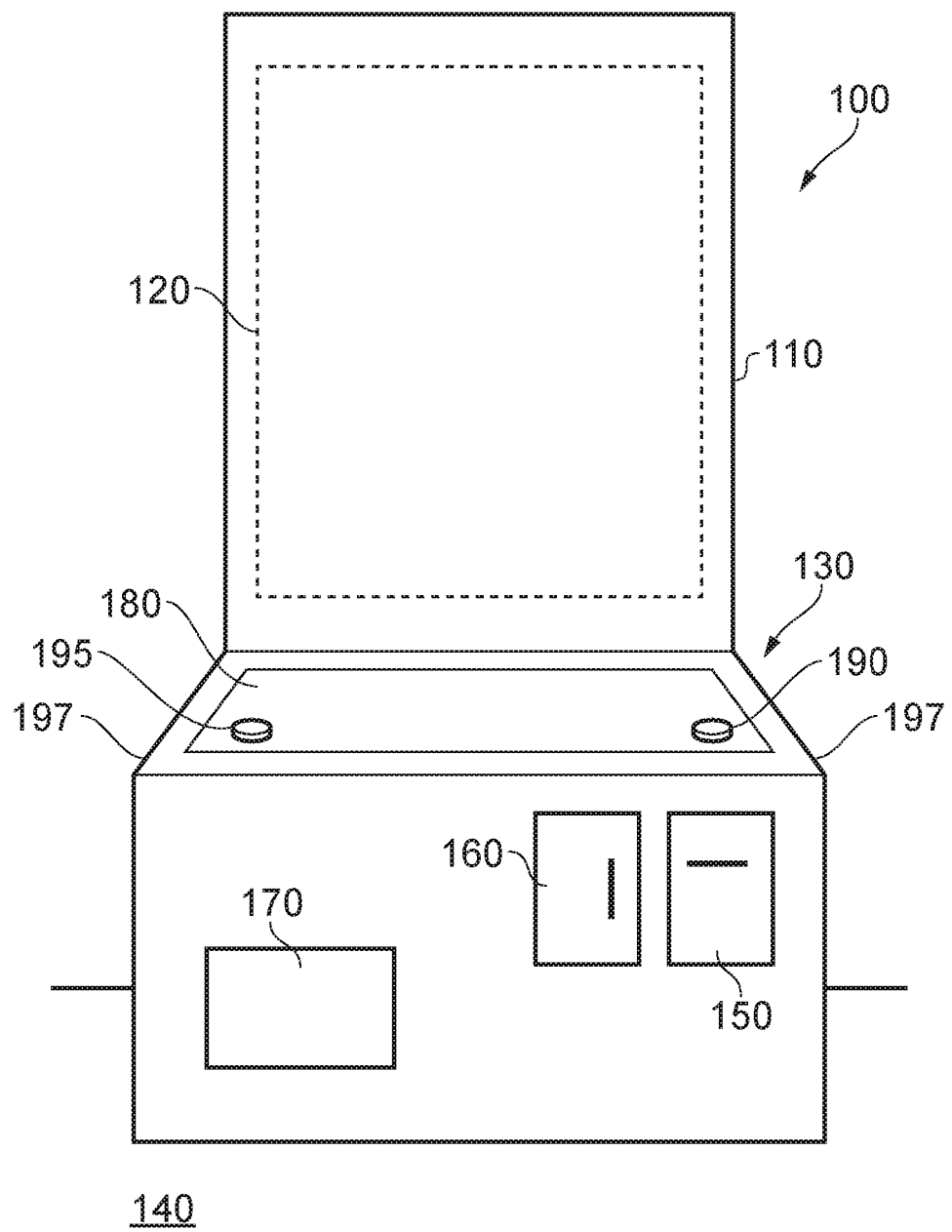
FIG. 1 illustrates a gambling machine with a touch screen that includes multiple mechanical buttons within an active area.

FIG. 1 illustrates a gaming machine 100. The gaming machine 100 is an example of a machine with which certain embodiments of the present invention can be utilised. Other such machines include information kiosks, ATMs, industrial machines or the like. The machine 100 includes a front panel 110 which includes an art work zone 120 associated with a game. The artwork zone 120 may include lighting or other visual effects. The gambling machine 100 includes a button deck 130 which is located a convenient distance from a floor 140 on which the gambling machine 100 rests. The button deck 130 is utilised by users to provide user input signals to the gaming machine 100. Respective user payment slots including a note slot 150 or coin slot 160 are provided together with a pay-out pot 170.

The button deck 130 includes a touch screen 180 together with two spaced apart mechanical buttons 190, 195. Each button includes transparent portions so that the button themselves which sit over a display of the touch screen act as light guides. In this way imagery displayed via a display of the touch screen can be communicated to a user of the gaming machine 100. It will be appreciated by those skilled in the art that other types of button which do not act as a light guide may be utilised according to certain embodiments of the present invention. Likewise the number, shape and location of buttons is variable according to certain embodiments of the present invention. The mechanical buttons can be used as so-called bash buttons.

Figure 2:
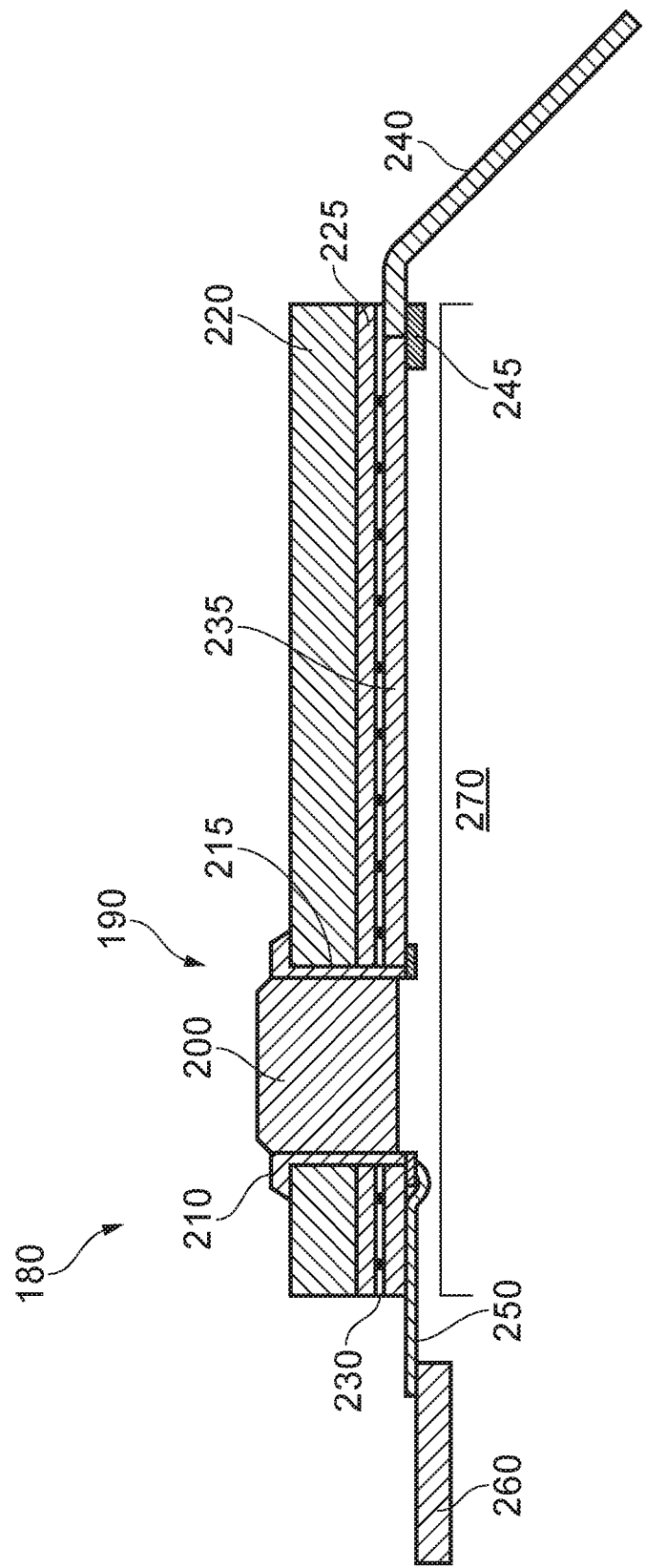
FIG. 2 illustrates a cross section through parts of a touch screen showing a touch panel over a display screen in which the touch panel incorporates a button.

FIG. 2 illustrates parts of the touch screen 180 shown in FIG. 1 in more detail. In particular FIG. 2 helps illustrate a button 190 in more detail. The button is an example of a mechanical input device. The button 190 includes a central movable actuator 200 which is moveable with respect to a button housing 210. The top of the button actuator can be pressed by a user which moves the actuator with respect to the housing. A micro switch or the like indicates pressing. The button 190 passes through a through hole in a glass substrate 220 of the touch panel of the touch screen. It will be appreciated that according to certain embodiments of the present invention the hole 215 in the substrate may not necessarily be a through hole but could instead be a recessed region in which the button sits. A layer of pressure sensitive optically clear adhesive 225 is provide on an under surface of the substrate. The upper surface of the substrate is in a plane which receives actual touches from a user wishing to activate the touch screen. The substrate could itself be formed from multiple layers.

A grid of electrodes 230 is provided on a lower surface of the laminate. The grid 230 of electrodes illustrated is a grid of fine wires generated on the adhesive layer 225 utilising a plotting technique. Aptly the wires have a diameter in the region of 4 to 40 microns. Aptly the wire diameter is 5 to 18 microns. Aptly the wires are coated with a thin electrically insulating material. It will be appreciated that according to certain other embodiments of the present invention the electrode grid can be created using other electrode forming techniques such as by deposition of an ITO layer or the like.

A polyester film layer 235 which is likewise optically clear covers a lower surface of the electrode grid. A flexible cable 240 is attached at a peripheral edge region to the wire electrodes. The flexible cable 240 is attached to a touch controller or optionally to the host gaming machine computer. A tape 245 can be utilised to cover the flexible cable and keep it in place.

The touch screen 180 also includes a transparent flexible cable 250 to connect the button output to a button controller 260. This is likewise connected to the computer system of the host gaming machine. The display 270 lies underneath the touch panel. In this way information displayed from the upper surface of the display can be seen by a human user through the touch panel located above the display 270. A user observing the displayed imagery or other such visual cues touches relative points on the upper surface of the touch panel and/or presses a button within the active area of the touch panel to thereby provide user input making respective user selections.

Figure 3:
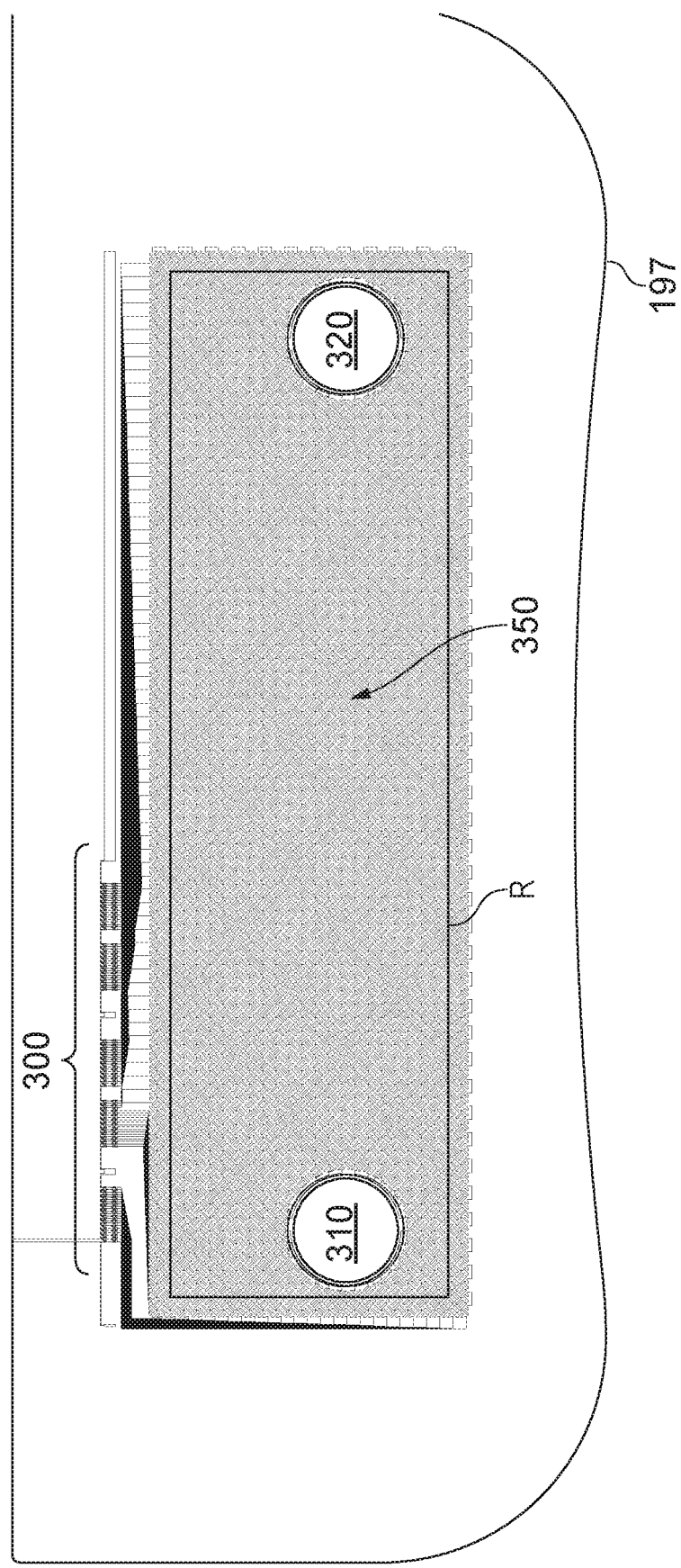
FIG. 3 illustrates drive electrodes and sensor electrodes and edge connectors for a touch panel.

FIG. 3 helps illustrate the grid 230 of electrodes arranged in a pattern for the touch screen. The touch panel is a capacitive sensing touch panel and includes drive electrodes and sensor electrodes accordingly which are driven and read via respective connectors 300. As illustrated in FIG. 3 all electrodes can be connected from a single side of the electrode grid meaning that a very thin surround only is required for the touch panel.

As illustrated in FIG. 3 the electrodes have a pathway which does not pass through the area where the buttons 190, 195 are located. In this sense a first excluded zone 310 is associated with a through hole in the substrate 220 where the respective button 190 is located and a further excluded zone 320 is associated with a through hole through the substrate 220 where the further button 195 is located. As illustrated in FIG. 3 the pathway of the electrodes is different close to and immediately surrounding each excluded zone relative to the pathway which is otherwise followed by electrodes in regions of the active area of the touch panel where the buttons are not located. An inner region of the electrode array indicated by rectangle R defines an active area 350 of the touch panel.

Figure 4:
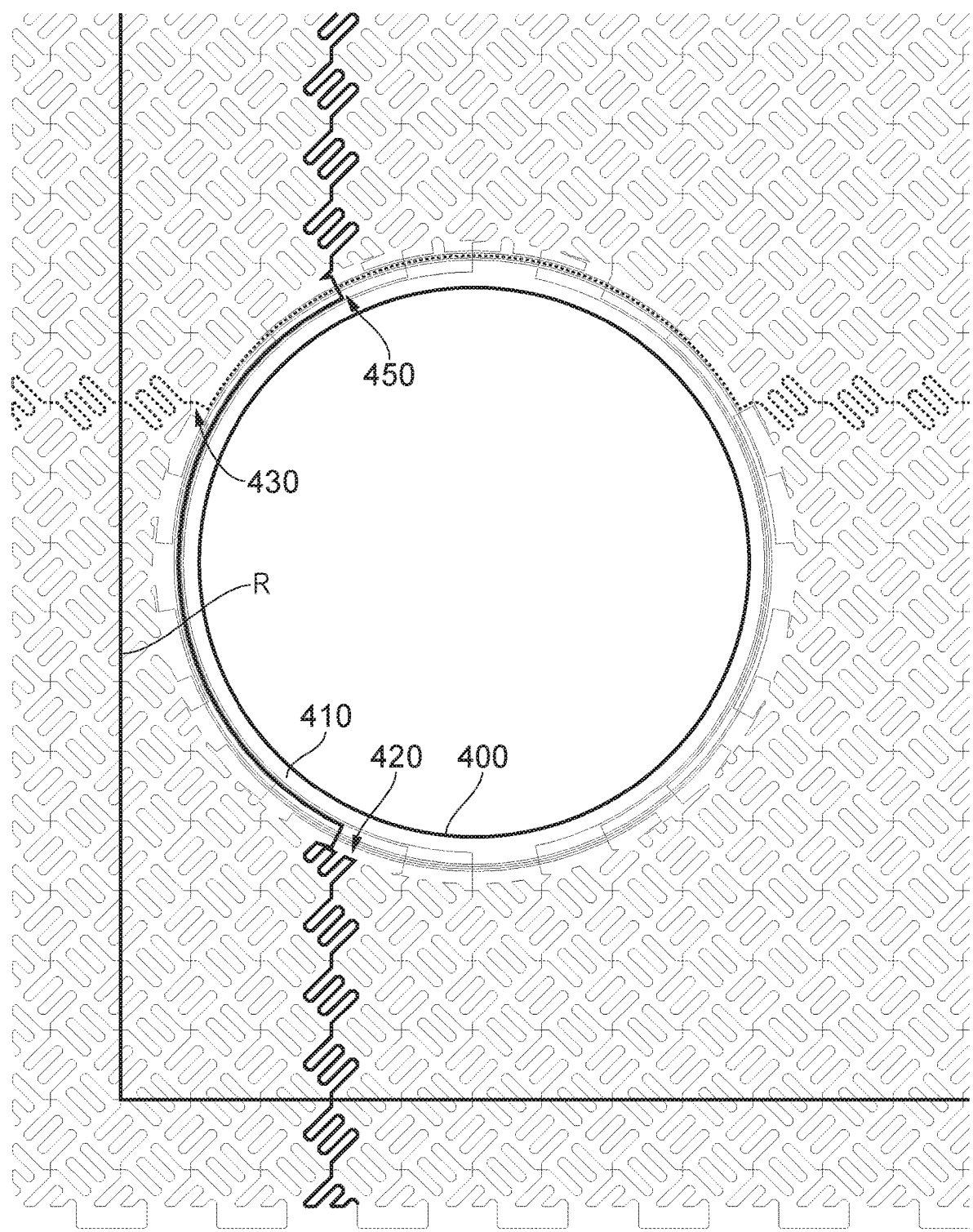
FIG. 4 illustrates drive electrodes and sensor electrodes around a round throughhole in a glass panel of the touch screen in more detail.

FIG. 4 helps illustrate the pathway of electrodes surrounding a round hole in a position corresponding to the left hand side button 195 shown in FIG. 1 in more detail.

FIG. 4 illustrates an edge 400 of a through hole. A margin 410 is a ring-like region which contains no electrodes and which immediately surrounds the edge of the hole. Aptly the margin is 1 to 3 mm wide. The drive electrodes and sensor electrodes run approximately up and down vertically and left to right horizontally in FIG. 4. It will be appreciated that other orientations could be utilised according to certain aspects of the present invention. For the sake of clarity one electrode track running from the bottom of FIG. 4 to the top of FIG. 4 is highlighted in bold and labelled as electrode 420. A further electrode running left to right in FIG. 4 is shown in dotted line format for convenience. This electrode is labelled 430. Each drive electrode and sensor electrode of the electrode grid follows a repetitive labyrinthine pathway. Each drive electrode crosses a sensor electrode at a respective crossing point 450 and each crossing point 450 defines a centre of a respective cell having a respective cell index of the touch panel. As illustrated in FIG. 4 the drive electrode and sensor electrode shown have a crossing point that defines a respective centre of a cell which is offset from a position where it would otherwise be located had the hole in the substrate not being positioned where it is, the electrode grid thus not being disturbed. Because of this offset position there is a risk that a touch would be identified in an incorrect position.

As illustrated the electrode 430 follows a labyrinthine pathway from the left hand side of FIG. 4 via two convoluted pathway portions separated by a substantially straight pathway portion (where a crossing point with another electrode occurs) and then from the second convoluted pathway portion the pathway of the electrode turns substantially perpendicular to the edge 400 close to the electrode. The pathway then immediately turns around 90° left and then tracks around the aperture maintaining a predetermined distance away from the edge 400. When the circumventing pathway portion which is substantially parallel to the edge of the hole reaches a point corresponding to the point where it turned to track the edge, the pathway turns outwards substantially perpendicular to the edge local to the turning point and then follows a short pathway portion running perpendicular to the local edge region. After that straight portion has run for a predetermined distance the electrode pathway returns to the common repeated electrode pathway. That is to say adopts an undisturbed pathway similar to other pathways followed by electrodes not proximate to a hole. Each electrode pathway has a shape which matches an undisturbed electrode pathway pattern to a point which is a predetermined distance away from an edge 400 of a hole. Aptly this distance is about 6 mm from a hole edge. Aptly the distance is between 3 and 7 mm from an edge of a hole in the aperture.

FIG. 5 schematically illustrates the grid 230 with crossing points of sensor electrodes and drive electrodes providing respective capacitive nodes associated with a cell centre. GB2502601, the disclosure of which is incorporated herein by reference, discloses a suitable plotting technique for providing the electrode grid and aspects of a controller unit usable according to embodiments of the present invention. In more detail FIG. 5 provides a schematic diagram illustrating components of a touch detector unit 500. The touch detector unit 500 is connected to a multi-touch touch panel 502 comprising X-plane and Y-plane insulated conducting wires via a flexi-tail connector (not shown in FIG. 5).

The touch detector unit 500 includes a level generation circuit 503 that generates a voltage pulse signal which is input to a multiplexer 504 connected, via the flexi-tail connector, to the X-plane insulated conducting wires of the multi-touch sensing panel 502. The multiplexer 504 selects one of the X-plane insulated conducting wires and sends the pulse signal generated by the level generation circuit 503 to the selected X-plane insulated conducting wires. Energy from the voltage pulse signal is transferred to the Y-plane insulated conducting wires of the multi-touch sensing panel 502 by capacitive coupling.

The Y-plane insulated conducting wires are connected via the flexi-tail connector to one of a number of multiplexes A, B, C in a multiplexer array 505. Each multiplexer is connected to a respective receive circuit 506A, 506B, 506C. On the transmission of a voltage pulse signal on an X-plane insulated conducting wire, each multiplexer of the multiplexer array 505 is arranged to connect each Y-plane insulated conducting wire to which it is connected to the receive circuit 506A, 506B, 506C to which it is connected. In this way a complete scan of the multi-touch sensing panel is performed.

As illustrated in FIG. 5 in more detail each receive circuit 506 comprises an amplifier 507, a peak detector 508, peak detector charge and discharge switches 509, 510 and an analogue to digital converter 511. The process includes measuring the voltage pulse signal on each Y-plane insulated conducted wire and outputting as a digital value to the microprocessor 512. Eventually a digital value is sent to the microprocessor 512 for all of the intersection points of the multi-touch sensing panel 502.

Once all the digital values corresponding to the voltage pulse on each Y-plane insulated conducting wire has been input to the microprocessor 512, the microprocessor converts these values into a suitable format and then outputs multi-touch data corresponding to detected multiple user touches on the multi-touch sensing panel 502 on an output line 513.

Optionally the microprocessor performs further processing to refine the data received from the received circuits prior to outputting data to a host computer system. For example the microprocessor may have access to memory holding an up to date list of excluded cells. Aptly this list is set on manufacture. If the microprocessor determines that a touch has been received at a cell having an index which is an index currently listed in a list of excluded cells the microprocessor ignores this as a touch and does not indicate a touch. In this way according to certain embodiments of the present invention the microprocessor can accommodate the fact that there are holes within the active area of the multi-touch sensing panel 502. Alternatively the microprocessor has access to a virtual field having a corresponding area corresponding to the active area of the touch panel. Data for the virtual field is stored in memory and includes one or more prohibited areas which correspond to locations on the active area of the touch panel where buttons or other user input devices are located. The granularity of the virtual field is high. That is to say the virtual field has many identifiable locations so that each prohibited area can be a finely-defined shape having any desired outline. The virtual field and associated prohibited areas are stored in a memory 520 associated with the microprocessor and accessible by it. In this way the microprocessor can determine possible touches and then compare the possible touches with the prohibited areas of the virtual field. If an interpolated touch falls within a prohibited area in the virtual field the microprocessor ignores this as a possible touch event.

FIG. 6 helps illustrate cell indexes A1 . . . J10 associated with the crossing points of drive electrodes 1 . . . 10 and sensor electrodes A . . . J.

FIG. 7 helps illustrate cell indexes in a region around a circular hole.

FIG. 8 helps illustrate how a virtual field that is correlated to an active area of a touch screen can include prohibited areas (two shown in FIG. 8). Each prohibited area corresponds to a region of the touch screen where a user input device is located and which cannot provide a touch screen input signal. The granularity of the virtual field is high meaning that a prohibited area can have a wide variety of shapes which can thus define excluded zones for a wide variety of shaped user input devices.

FIG. 9 illustrates electrode pathways around a square hole.

FIG. 10 illustrates electrode pathways around a triangular hole.

FIGS. 11A to 11H illustrate how a touch panel can be manufactured according to certain embodiments of the present invention. At step 11A pressure sensitive optically clear adhesive 1125 is laminated to a glass panel 1120 which has been pre-prepared with one or more hole 1115. Aptly an Optically Clear Adhesive (OCA or sometimes known as Pressure Sensitive Adhesive PSA) is provided on a roll. The roll of OCA is fitted to a de-spooling drum on a lamination machine. The glass is presented to a set of nip rollers and the OCA is fed in to the nip rollers from the top via the de-spooler and the glass passes through the centre of the two nip rollers. As the glass passes through the nip rollers the OCA is applied to the glass surface. Rollers may be heated to allow the OCA material to flow better. The speed of the rollers is controlled to ensure any bubbles between the two surfaces are evacuated from the lamination. Aptly a nip roller laminator can be used. Alternatively the OCA may be laminated using hand held rollers and applying a slight amount of soap/water to the surface of the glass to allow the OCA material to be wet applied. The adhesive is trimmed to the outer size of the substrate 1120 before or after lamination. It will be appreciated by the person skilled in the art that in addition to using a glass panel for the substrate, any other suitable materials may be used, such as plastics, polycarbonate, acrylic and the like. Aptly, the glass panel has a thickness of about around 0.5 to 15 mm of glass. Aptly the thickness is 0.7 to 12 mm. Aptly a 3 mm or 4 mm or 6 mm substrate is used. Aptly an optically clear adhesive is used. Aptly the thickness of the adhesive is 20 μm to 250 μm. Aptly the thickness is 25 μm to 200 μm. Aptly a 125 μm or a 188 μm thickness is used.

Figure 11B:
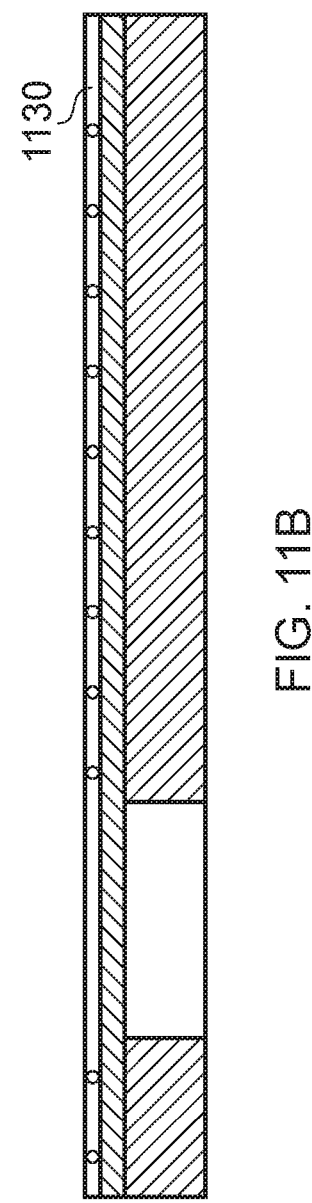

In FIG. 11B wire electrodes 1130 are shown deposited on to the adhesive surface in a pre-designed pattern. Aptly the electrodes can be provided using CNC wire laying machines. The electrode pattern used routes electrode wires around and outside of the holes. It will be appreciated that other techniques, such as lithographic techniques can be utilised to lay down electrode tracks in a desired pattern around holes in the touch panel. Using fine wire can avoid having to "neck" lithographically produced electrode tracks.

At the step shown in FIG. 11C an optically clear polyester film 1135 is laminated over the electrode wires 1130 and adhesive 1125. Aptly the polyester film is Polyethylene Terephthalate (PET). Alternatively thin glass can be used that bends for lamination. Aptly the thickness is around 0.2 mm to 0.7 mm. Alternatively thin acrylic can be used. Alternatively thin polycarbonate can be used. Alternatively Tri-acetyl Cellulose (TAC) can be used. Alternatively Polyethylene Naphthalate (PEN) film can be used. Aptly the thickness of the PET film is 20 µm to 250 µm. Aptly the thickness is 25 µm to 200 µm. Aptly the film is 125 µm or 188 µm thick. The polyester film 1135 is trimmed to the outer side of the panel either before or after lamination. The adhesive and wire electrodes left exposed can provide flexible cable connection positions at the edge of the touch panel.

FIG. 11D illustrates how a flexible cable 1140 can next be attached over the exposed wire electrodes at a peripheral edge region of the touch panel being formed.

FIG. 11E helps illustrate the step of applying a polyimide tape 1145 to cover the flexible cable (S) and adjacent exposed adhesive areas.

FIG. 11F illustrates the step of trimming the adhesive 1125 and polyester film 1135 back to a glass edge at the edge of each hole 1115. Aptly this is carried out using a sharp bladed instrument.

FIG. 11G helps illustrate the step of electrically connecting wire electrodes to a flexible cable using a hot bar thermode reflow soldering process. Alternatively a laser welding process or other such connecting technique could be used. Aptly the wires are soldered to flexi tail pads using a thermode/hot bar bonding process or laser welding process (fibre laser) or the like. If the wire has a thin (circa 2 µm) insulation layer around a central core of copper wire the insulation layer can be selectively removed. To remove the insulation layer the wire is heated to a temperature where the insulation is melted and removed. Aptly the temperature is around 450° C. Other techniques can of course be used. Wire at a joint area is in direct contact with tin plated flexible cable pads that are located over wire termination points. Heating of the rear of these flexible tail pads causes heat to be coupled in to the pad area and this starts to reflow the tin on the individual pads. This reflow of the tin causes the insulation on the individual wires to melt. This exposes the copper of the wire below the insulation and an intermetallic joint is formed between each of the tin pads and the individual copper wires where the insulation has been melted and removed.

FIG. 11H helps illustrate the step of fitting a button 1190 to the sensor. The button 1190 is connected to a transparent flexible cable 1150 which connects the button output to a button controller 1160.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method for detecting touches at a sensing plane of a touch panel that includes at least one excluded zone, the method comprising:
   determining a location of a possible touch on a touch panel,
   determining if said location is associated with an excluded zone in an active region of the touch panel, and
   indicating a detected touch in response to determining that said location is not associated with the at least one excluded zone,
   wherein the at least one excluded zone has a shape that corresponds with a shape of a hole comprising a respective through hole or recess in a substrate of the touch panel.

2. The method as claimed in claim 1, wherein:
   determining if said location is associated with the excluded zone comprises determining if a cell associated with said a-location is a cell having a cell index included in a list of excluded cell indexes, and
   the method further comprises:
      preventing a detected touch being indicated in response to determining that said cell index is included in said list of excluded cell indexes.

3. The method as claimed in claim 1, wherein:
   determining if said location is associated with the excluded zone comprises determining if an interpolated touch position for said location is within a predetermined prohibited area corresponding to the excluded zone, and
   the method further comprises:
      preventing a detected touch being indicated in response to determining that the interpolated touch position is within the predetermined prohibited area, and
   wherein the predetermined prohibited area is a region of a virtual field correlated to the active region of the touch panel.

4. The method as claimed in claim 1, further comprising:
   via a host computer, receiving touch signals that indicate a detected touch in the active region of the touch panel and receiving input signals from at least one user input device located in the active region.

5. A non-transitory storage medium comprising a computer program or computer code executable by a computer or microprocessor of a touch controller configured to perform the method of claim 1.

6. A touch panel, comprising a transparent substrate comprising at least one hole, an electrode grid, proximate to a surface of the substrate, including a plurality of sensor electrodes and a plurality of drive electrodes arranged in a pattern, wherein the sensor electrodes and drive electrodes are arranged in a pattern that routes a plurality of the electrodes around at least a portion of an edge region of any hole.

7. The touch panel as claimed in claim 6, wherein:
each sensor electrode that is not routed around a hole follows a repetitive labyrinthine pathway, and each drive electrode that is not routed around a hole follows a repetitive labyrinthine pathway.

8. The touch panel as claimed in claim 6, wherein:
each sensor electrode and drive electrode crosses at a respective crossing point and each crossing point defines a center of a respective cell, having a respective cell index, of the touch panel, and
the cells tessellate in regions distal to a hole in the grid.

9. The touch panel as claimed in claim 6, wherein:
no portion of any electrode is located within a predetermined margin at an edge region of each hole.

10. The touch panel as claimed in claim 6, wherein:
electrodes are routed around the hole along a pathway including a circumventing pathway portion that is spaced apart from and parallel to an adjacent portion of the edge region.

11. The touch panel as claimed in claim 6, wherein:
each rerouted electrode follows a usual pathway, corresponding to a pathway followed commonly in cells distal to a hole, until the usual path of an electrode pathway extends to within a predetermined distance of an edge region of a hole at which point the electrode pathway is immediately turned perpendicular to a local edge region,
after turning perpendicular to the local edge region, the electrode pathway extends in a straight pathway portion and is then further turned in a direction perpendicular to the straight pathway portion into a circumventing pathway portion in which the electrode pathway is spaced apart from and runs parallel to an adjacent portion of the edge region, and
the edge region of each hole or the edge region plus predetermined margin of each hole corresponds with an excluded zone in an active region of the touch panel.

12. A touch screen system, comprising a touch panel comprising a substrate and an electrode grid proximate to a first surface of the substrate, a display proximate to the touch panel, and a touch detector that receives signals from sensor electrodes of the electrode grid and indicates a detected touch only if a location of a possible touch is not associated with an excluded zone in an active region of the touch panel,
wherein the excluded zone has a shape that corresponds with a shape of a hole comprising a respective through hole or recess in the substrate of the touch panel.

* * * * *